United States Patent
Chen et al.

(10) Patent No.: US 10,659,574 B2
(45) Date of Patent: May 19, 2020

(54) COMMUNICATION DEVICE, METHOD OF COMMUNICATION DEVICE, AND NON-TRANSITORY COMPUTER READABLE STORAGE MEDIUM

(71) Applicant: HTC Corporation, Taoyuan (TW)

(72) Inventors: Kai-Hsiu Chen, Taoyuan (TW); Cheng-Kang Lin, Taoyuan (TW); Yao-Te Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 322 days.

(21) Appl. No.: 15/465,578

(22) Filed: Mar. 21, 2017

(65) Prior Publication Data

US 2018/0103130 A1    Apr. 12, 2018

Related U.S. Application Data

(60) Provisional application No. 62/404,776, filed on Oct. 6, 2016.

(51) Int. Cl.
*H04L 29/06* (2006.01)
*H04L 29/08* (2006.01)

(52) U.S. Cl.
CPC ............ *H04L 69/24* (2013.01); *H04L 67/141* (2013.01)

(58) Field of Classification Search
USPC .......................... 709/227, 228, 204
See application file for complete search history.

(56) References Cited

U.S. PATENT DOCUMENTS

| | | | | |
|---|---|---|---|---|
| 2007/0238417 | A1* | 10/2007 | Bennett | H04W 52/24 455/69 |
| 2011/0156640 | A1* | 6/2011 | Moshfeghi | H02J 50/20 320/108 |

* cited by examiner

*Primary Examiner* — Chirag R Patel
*Assistant Examiner* — Marshall M McLeod
(74) *Attorney, Agent, or Firm* — CKC & Partners Co., LLC

(57) ABSTRACT

An operating method of a communication device includes performing a scan procedure to receive a device name and an address of an external device; determining a connection interval corresponding to the external device according to one or more policies stored in the communication device under a condition that the device name and/or the address match the one or more policies; and building a connection with the external device according to the connection interval and the address of the external device, so that the communication device and the external device communicate corresponding to the connection interval.

13 Claims, 5 Drawing Sheets

COMMUNICATION DEVICE, METHOD OF COMMUNICATION DEVICE, AND NON-TRANSITORY COMPUTER READABLE STORAGE MEDIUM

RELATED APPLICATIONS

This application claims priority to U.S. Provisional Application Ser. No. 62/404,776, filed Oct. 6, 2016, which is herein incorporated by reference.

BACKGROUND

Technical Field

The present disclosure relates to an electronic device, a method, and a non-transitory computer readable storage medium. More particularly, the present disclosure relates to a communication device, a method of the communication device, and a non-transitory computer readable storage medium.

Description of Related Art

With advances in technology, communication devices, such as phones and computers, are being increasingly used.

A communication device may communicate with different target devices in a same connection speed. However, the target devices may respectively have different abilities and require different data. It is not able to the communications with the same connection speed to fit the requirements of the targets devices.

SUMMARY

One aspect of the present disclosure is related to a method of a communication device. In accordance with one embodiment of the present disclosure, the method includes performing a scan procedure to receive a device name and an address of an external device; determining a connection interval corresponding to the external device according to one or more policies stored in the communication device under a condition that the device name and/or the address match the one or more policies; and building a connection with the external device according to the connection interval and the address of the external device, so that the communication device and the external device communicate corresponding to the connection interval.

Another aspect of the present disclosure is related to a communication device. In accordance with one embodiment of the present disclosure, the communication device includes a communication component, one or more processing components, memory, and one or more programs. The one or more processing components are electrically connected to communication component. The memory is electrically connected to the one or more processing components. The one or more programs are stored in the memory and configured to be executed by the one or more processing components. The one or more programs include instructions for controlling the communication component for performing a scan procedure to receive a device name and an address of an external device; determining a connection interval corresponding to the external device according to one or more policies stored in the communication device under a condition that the device name and/or the address match the one or more policies; and controlling the communication component for building a connection with the external device according to the connection interval and the address of the external device, so that the communication device and the external device communicate corresponding to the connection interval.

Another aspect of the present disclosure is related to a non-transitory computer readable storage medium. In accordance with one embodiment of the present disclosure, the non-transitory computer readable storage medium storing one or more programs include instructions, which when executed, causes one or more processing components to perform operations including performing a scan procedure to receive a device name and an address of an external device; determining a connection interval corresponding to the external device according to one or more policies stored in the communication device under a condition that the device name and/or the address match the one or more policies; and building a connection with the external device according to the connection interval and the address of the external device, so that the communication device and the external device communicate corresponding to the connection interval.

Through the operations of one embodiment described above, the connection intervals can be individually determined according to the policy.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
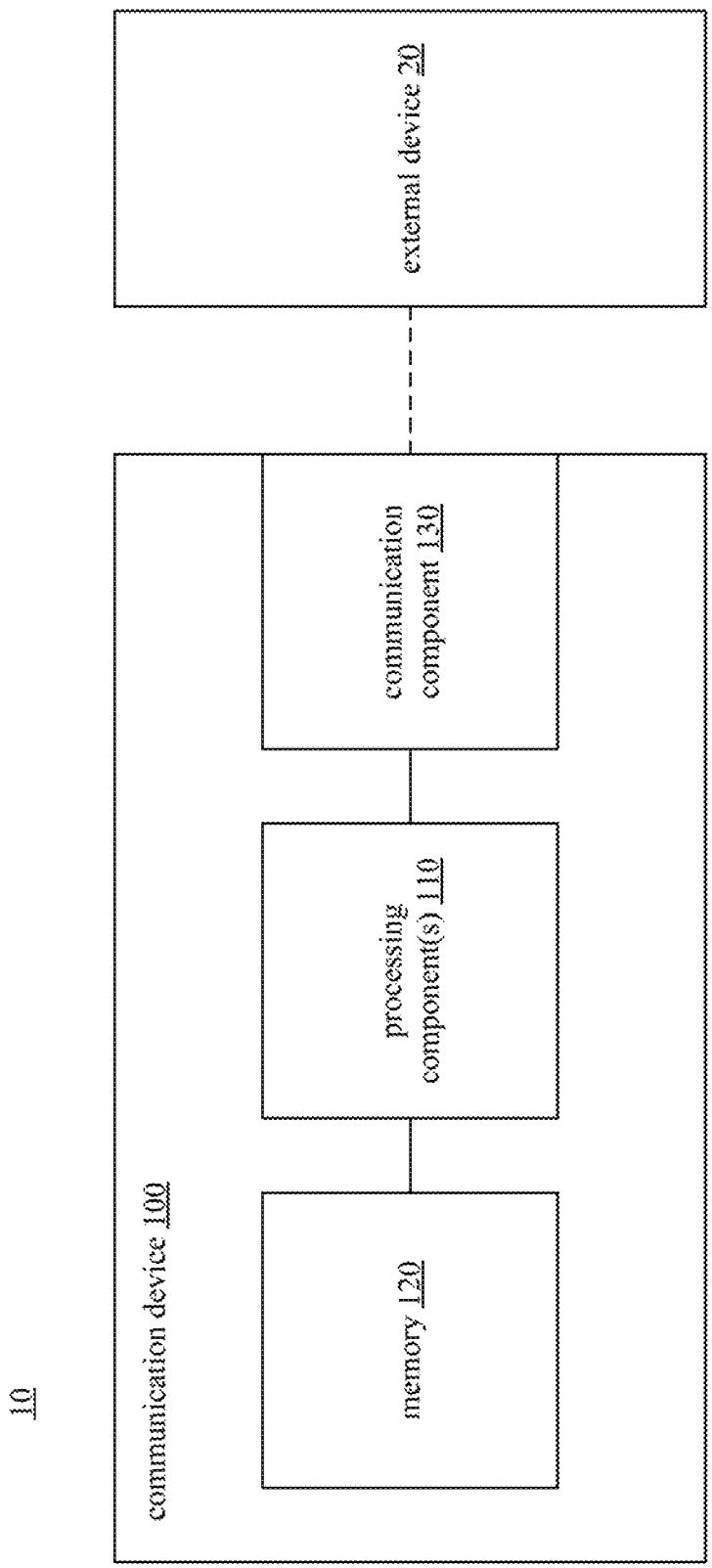
FIG. 1 is a schematic block diagram of a communication system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a communication device. In the paragraphs below, a smart phone will be taken as an example to describe details of the communication device. However, another communication device, such as a tablet computer or a laptop computer, is within the contemplated scope of the present disclosure.

FIG. 1 is a schematic block diagram of a communication system 10 in accordance with one embodiment of the present disclosure. In this embodiment, the communication system 10 includes a communication device 100 and an external device 20. In one embodiment, the communication device 100 may communicate with the external device 20 via wireless connection. In one embodiment, the communication device 100 may communicate with the external device 20 by using, for example, bluetooth technology, bluetooth low energy (BLE) technology, or Wi-Fi technology, but the present disclosure is not limited in this regard.

In one embodiment, the communication device 100 includes one or more processing components 110, a memory 120, and a communication component 130. In this embodiment, the processing component one or more processing components 110 is electrically connected to the memory 120 and the communication component 130.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The computer readable storage medium may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains. The communication component 130 can be realized by, for example, a bluetooth communication component, a BLE communication component, or a Wi-Fi communication component, but is not limited in this regard.

In one embodiment, the one or more processing components 110 may run or execute various software programs and/or sets of instructions stored in the memory 120 to perform various functions for the communication device 100 and to process data.

In one embodiment, the external device 20 may continuously broadcast its advertising data. The advertising data may include a device name and an address of the external device 20. The one or more processing components 110 may control the communication component 130 to perform a scanning procedure to receive device names and addresses of devices within the connection range of the communication component 130. In this embodiment, the one or more processing components 110 can acquire the device name and the address of the external device 20 in the scanning procedure. Subsequently, the one or more processing components 110 may compare the device name and the address of the external device 20 with policies stored in the memory 120. Under a condition that the device name and/or the address of the external device 20 match one or more of the policies, the one or more processing components 110 may determine a connection interval corresponding to a connection between the communication device 100 and the external device 20.

In one embodiment, the connection interval corresponds to a connection speed of the connection between the communication device 100 and the external device 20. In one embodiment, the connection interval indicates an interval time between two adjacent times of the communication device 100 connecting the external device 20 in the connection. For example, when the interval time of the connection between the communication device 100 and the external device 20 is 7.5 ms, the communication device 100 communicates with the external device 20 once every 7.5 ms. In one embodiment, the capability of the connection interval of the communication device 100 is, for example, 7.5 ms-50 ms.

After the connection interval is determined, the one or more processing components 110 can control the communication component 130 to build a connection with the external device 20 according to the determined connection interval and the address of the external device 20, so that the communication device 100 and the external device 20 communicate corresponding to the connection interval.

Through such a configuration, different connection intervals corresponding to different external devices can be determined individually.

Details of the present disclosure are described in the paragraphs below with reference to an operating method in FIG. 2. However, the present disclosure is not limited to the embodiment below.

It should be noted that the operating method can be applied to a communication device having a structure that is the same as or similar to the structure of the communication device 100 shown in FIG. 1. To simplify the description below, the embodiment shown in FIG. 1 will be used as an example to describe the operating method according to an embodiment of the present disclosure. However, the present disclosure is not limited to application to the embodiment shown in FIG. 1.

Figure 2:
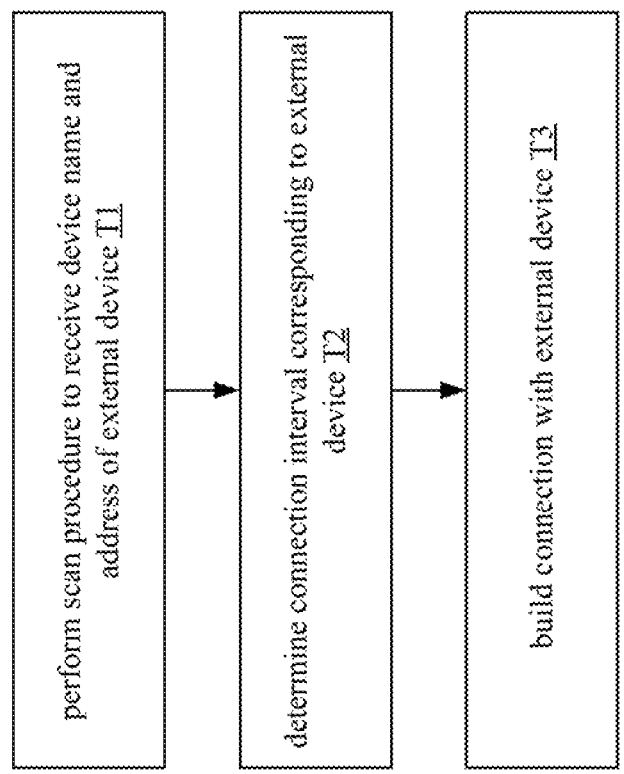
FIG. 2 is a flowchart of an operating method in accordance with one embodiment of the present disclosure.

Reference is made to FIGS. 1 and 2. The operating method 200 includes the operations below.

In operation T1, the one or more processing components 110 control the communication component 130 to perform a scan procedure to receive a device name and an address of the external device 20. In one embodiment, the external device 20 continuously broadcasts advertising data including the device name and the address of itself.

In operation T2, the one or more processing components 110 determine a connection interval corresponding to the external device 20 according to one or more of policies stored in the memory 120 under a condition that the device name and/or the address match the one or more of the policies.

For example, the policies may include a first policy that when the device name is abc123 or includes a certain string (e.g., HTC-VIVE), determining the corresponding connection interval to be a shortest connection interval (e.g., 7.5 ms) available for the communication device 100. Additionally, the policies may include a second policy that when the address is a certain address or within a certain address range, determining the corresponding connection interval to be a longest connection interval (e.g., 50 ms) available for the communication device 100. When the device name of the external device 20 meets the first policy, the corresponding connection interval is determined to be the shortest connection interval available for the communication device 100. When the address of the external device 20 matches the second policy, the corresponding connection interval is determined to be the longest connection interval available for the communication device 100. When the device name of the external device 20 match the first policy and the address of the external device 20 match the second policy concurrently, the one or more processing components 110 may determine the corresponding connection interval according to the priorities of the first policy and the second policy.

In one embodiment, the policies may be predetermined. In one embodiment, the policies may be determined according to the device types, the power statuses, and/or the data characteristic of the external devices. For example, when the external device is a light house of HTC Vive, when the external device 20 has a local power supply (e.g., receiving AC power from mains electricity), or when the data corresponding to the external device is timing constrained (e.g., needing a short connection interval to meet the deadline), the corresponding connection interval may be short.

In one embodiment, under a condition that both of the device name and the address of the external device 20 do not match anyone of the policies stored in the memory, the one or more processing components 110 may determine the connection interval corresponding to the external device 20 to be a default value (e.g., 50 ms).

In operation T3, after the connection interval is determined, the one or more processing components 110 control the communication component 130 to build a connection with the external device 20 according to the determined connection interval and the address of the external device 20. After the connection corresponding to the connection interval between the communication device 100 and the external device 20 is built, the communication device 100 and the external device 20 communicate corresponding to the connection interval.

Through such operations, different connection intervals corresponding to different external devices can be determined individually.

In one embodiment of the present disclosure, after the connection between the communication device 100 and the external device 20 is built, the one or more processing components 110 can set a new connection interval corresponding to the connection. Additionally, the external device 20 may send a request to the one or more processing components 110 to change the connection interval corresponding to the connection. The one or more processing components 110 can accept the request or ignore the request according to actual requirements.

In one embodiment, the one or more processing components 110 may set a new connection interval or the external device 20 may send a request to the one or more processing components 110 to change the connection interval according to a variation of the condition, such as a variation of power statuses, and/or the data characteristic.

For example, under a condition that the power status of the external device 20 is changed from having a local power supply to having no local power supply, the one or more processing components 110 may set a new connection interval or the external device 20 may send a request to the one or more processing components 110 to change the connection interval from a short interval (e.g., 7.5 ms) to a long interval (e.g., 50 ms). Under a condition that the power status of the external device 20 is changed from having no local power supply to having a local power supply, the one or more processing components 110 may set a new connection interval or the external device 20 may send a request to the one or more processing components 110 to change the connection interval from a long interval (e.g., 50 ms) to a short interval (e.g., 7.5 ms).

As another example, under a condition that the battery level of the external device 20 is lower than a first predetermined threshold (e.g., 60%), the one or more processing components 110 may set a new connection interval or the external device 20 may send a request to the one or more processing components 110 to change the connection interval from a short interval (e.g., 7.5 ms) to a long interval (e.g., 50 ms). Under a condition that the battery level of the external device 20 is greater than a second predetermined threshold (e.g., 80%), the one or more processing components 110 may set a new connection interval or the external device 20 may send a request to the one or more processing components 110 to change the connection interval from a long interval (e.g., 50 ms) to a short interval (e.g., 7.5 ms).

As another example, under a condition that the data between the communication device 100 and the external device 20 is timing constrained, the one or more processing components 110 may set a new connection interval or the external device 20 may send a request to the one or more processing components 110 to change the connection interval from a long interval (e.g., 50 ms) to a short interval (e.g., 7.5 ms). Under a condition that the data between the communication device 100 and the external device 20 is not timing constrained, the one or more processing components 110 may set a new connection interval or the external device 20 may send a request to the one or more processing components 110 to change the connection interval from a short interval (e.g., 7.5 ms) to a long interval (e.g., 50 ms).

Another aspect of the present disclosure is described in the paragraphs below, but the present disclosure is not limited in this regard.

In one embodiment, the one or more processing components 110 can receive information of whether the external device 20 has a local power supply, the battery level of the external device 20, whether data communicated between the communication device 100 and the external device 20 includes time-related data, the loading of the external device 20, and/or the capability of the external device 20. Additionally, the one or more processing components 110 can detect the loading of the communication device 100 and/or the degree of congestion between the communication device 100 and the external device 20.

In one embodiment, the one or more processing components 110 can determine the connection interval corresponding to the external device 20 according to one or more of the criteria including whether the device name and/or the address name of the external device 20 match one or more of the policies stored in the memory 120, whether the external device 20 has a local power supply, the battery level of the external device 20, whether data communicated between the communication device 100 and the external device 20 includes time-related data, the loading of the external device 20, the loading of the communication device 100, the degree of congestion between the communication device 100 and the external device 20, the capability of the external device 20, and an alarm.

For example, when the external device 20 has a local power supply, the connection interval may be determined to be 7.5 ms, and/or when the external device 20 has no local power supply, the connection interval may be determined to be 50 ms.

As another example, when the battery level of the external device 20 is between 80%-100%, the connection interval may be determined to be 7.5 ms, when the battery level of the external device 20 is between 60%-80%, the connection interval may be determined to be 30 ms, and/or when the battery level of the external device 20 is between 0%-60%, the connection interval may be determined to be 50 ms.

As another example, when the data communicated between the communication device 100 and the external device 20 include a time-related data (e.g., a power management command, such as a wake-up command or a shut-down command) needed to be transmitted to the external device 20 within a short time period, the connection interval may be determined to be 7.5 ms, and/or when the data communicated between the communication device 100 and the external device 20 do not includes time-related data, the connection interval may be determined to be 50 ms.

As another example, when the CPU loading of the external device 20 is between 0%-40%, the connection interval may be determined to be 7.5 ms, when the CPU loading of the external device 20 is between 40%-60%, the connection interval may be determined to be 15 ms, and/or when the CPU loading of the external device 20 is between 60%-100%, the connection interval may be determined to be 50 ms.

As another example, when the CPU loading of the communication device 100 is between 0%-30%, the connection interval may be determined to be 7.5 ms, when the CPU loading of the communication device 100 is between 30%-60%, the connection interval may be determined to be 15 ms, and/or when the CPU loading of the communication device 100 is between 60%-100%, the connection interval may be determined to be 50 ms.

As another example, when the degree of congestion between the communication device 100 and the external device 20 is light, the connection interval may be determined to be 7.5 ms, and/or when the degree of congestion between the communication device 100 and the external device 20 is severe, the connection interval may be determined to be 50 ms.

As another example, when the external device 20 is capable of the shortest connection interval (e.g., 7.5 ms) available for the communication device 100, the one or more processing components 110 determine the connection interval to be the shortest connection interval (e.g., 7.5 ms) available for the communication device 100, and/or when the external device 20 is incapable of the shortest connection interval (e.g., the available connection interval is 15 ms-50 ms) available for the communication device 100, the one or more processing components 110 determine the connection interval to be the shortest connection interval (e.g., 15 ms) available for the external device 20.

As another example, when an alarm occurs indicating that data between the communication device 100 and the external device 20 is timing constrained, the connection interval may be determined to be 7.5 ms, and/or when an alarm indicating the external device 20 or the communication device 100 has a heavy CPU loading, the connection interval may be determined to be 50 ms.

As another example, the one or more processing components 110 may determine the connection interval to be a shortest interval available for the communication device 100 in response to the facts that the battery level of the external device 20 is between 80%-100%, the CPU loadings of the external device 20 and the communication device 100 are between 0%-40%, and the degree of the congestion between the communication device 100 and the external device 20 is light.

Details of the present disclosure are described in the paragraphs below with reference to an operating method in FIG. 3. However, the present disclosure is not limited to the embodiment below.

Figure 3:
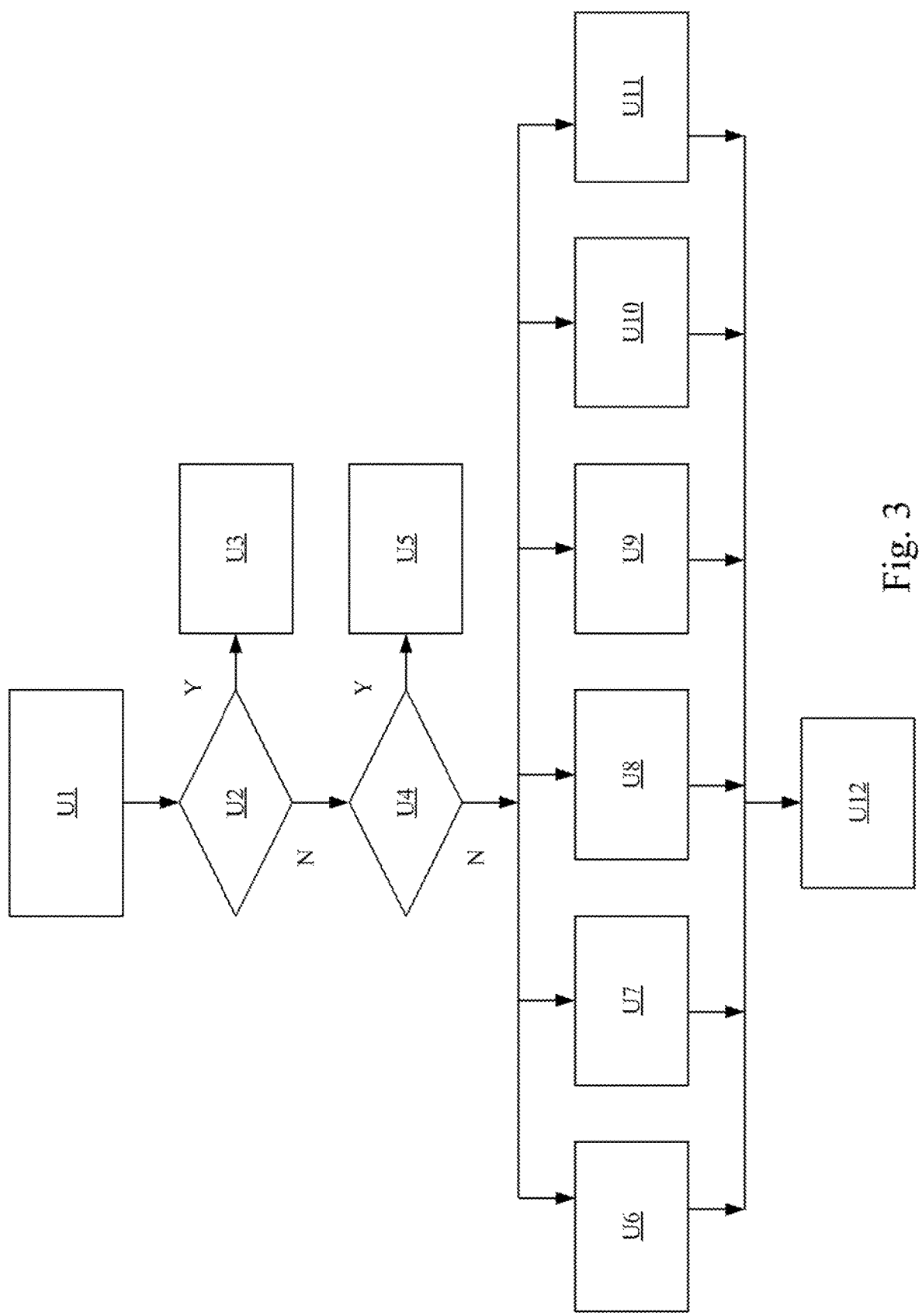
FIG. 3 is a flowchart of an operating method in accordance with one embodiment of the present disclosure.

Reference is made to FIGS. 1 and 3. The operating method 300 includes the operations below.

In operation U1, the one or more processing components 110 control the communication component 130 to perform a scan procedure to receive a device name and an address of the external device 20.

In operation U2, the one or more processing components 110 determine whether the device name and/or the address name of the external device 20 match one or more of the policies stored in the memory 120. If so, operation U3 is performed. If not operation U4 is performed.

In operation U3, under a condition that the device name and/or the address name of the external device 20 match one or more of the policies stored in the memory 120, the one or more processing components 110 determine a connection interval corresponding to the external device 20 according to the matched one or more of the policies.

In operation U4, under a condition that the device name and the address name of the external device 20 do not match any of the policies stored in the memory 120, the one or more processing components 110 determine whether the external device 20 has a local power supply. If so, operation U5 is performed. If not, one of operation U6-U11 is performed.

In operation U5, under a condition that the external device 20 has a local power supply, the one or more processing components 110 determine the connection interval corresponding to the external device 20 to be a shortest connection interval (e.g., 7.5 ms) available for the communication device 100.

In operation U6, under a condition that the external device 20 has no local power supply, the one or more processing components 110 determine the connection interval corresponding to the external device 20 according to the battery level of the external device 20.

In operation U7, under a condition that the external device 20 has no local power supply, the one or more processing components 110 determine the connection interval corresponding to the external device 20 according to whether the data communicated between the communication device 100 and the external device 20 includes time-related data.

In operation U8, under a condition that the external device 20 has no local power supply, the one or more processing components 110 determine the connection interval corresponding to the external device 20 according to the loading of the external device 20 and/or the loading of the communication device 100.

In operation U9, under a condition that the external device 20 has no local power supply, the one or more processing components 110 determine the connection interval corresponding to the external device 20 according to the degree of congestion between the communication device 100 and the external device 20.

In operation U10, under a condition that the external device 20 has no local power supply, the one or more processing components 110 determine the connection interval corresponding to the external device 20 according to the capability of the connection interval of the external device 20.

In operation U11, under a condition that the external device 20 has no local power supply, the one or more processing components 110 determine the connection interval corresponding to the external device 20 according to an alarm.

In operation U12, after one of operation U6-U11 is performed, the one or more processing components 110 control the communication component 130 to build a connection with the external device 20 according to the determined/default connection interval and the address of the external device 20.

Through such operations, different connection intervals corresponding to different external devices can be determined individually.

It should be noted that, details of the operating method 400 can be ascertained with reference to the paragraphs above, and a description in this regard will not be repeated.

It should be noted that, in different embodiments, operations U2 and U3, operations U4 and U5, and/or one or more of operations U6-U11 can be omitted on a basis of actual requirements.

Details of the present disclosure are described in the paragraphs below with reference to an operating method in FIG. 4. However, the present disclosure is not limited to the embodiment below.

Figure 4:
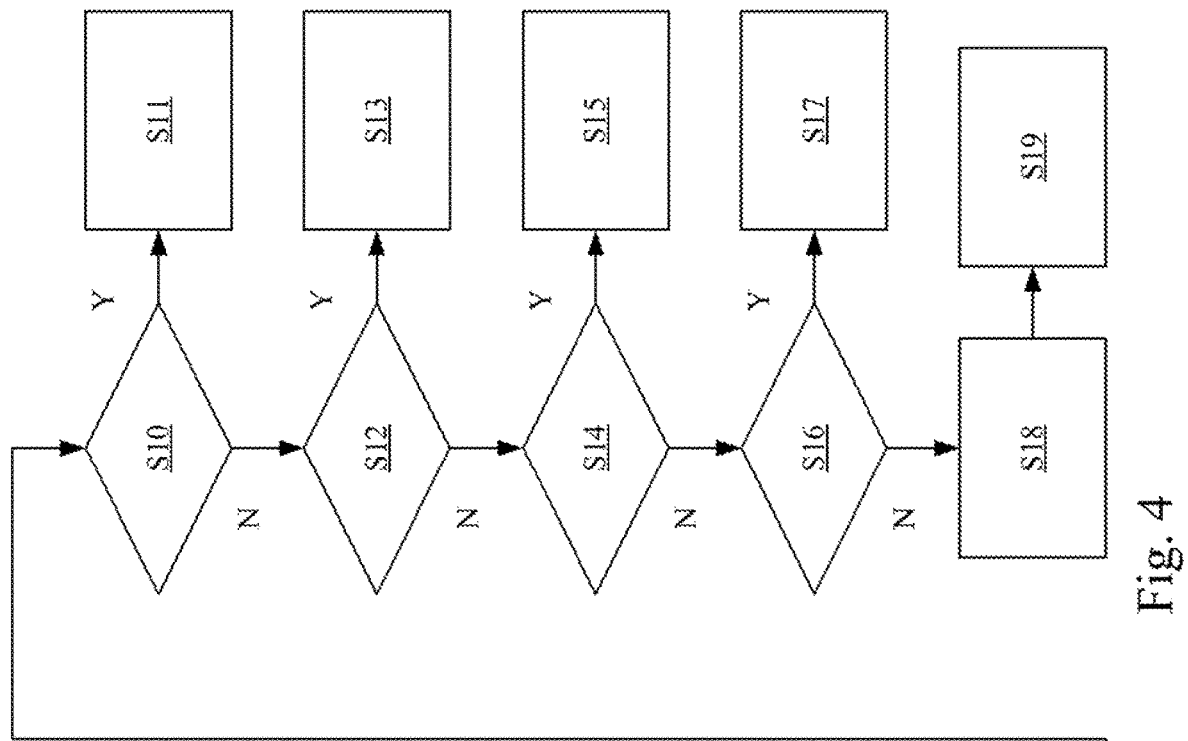
FIG. 4 is a flowchart of an operating method in accordance with one embodiment of the present disclosure.
Figure 4:
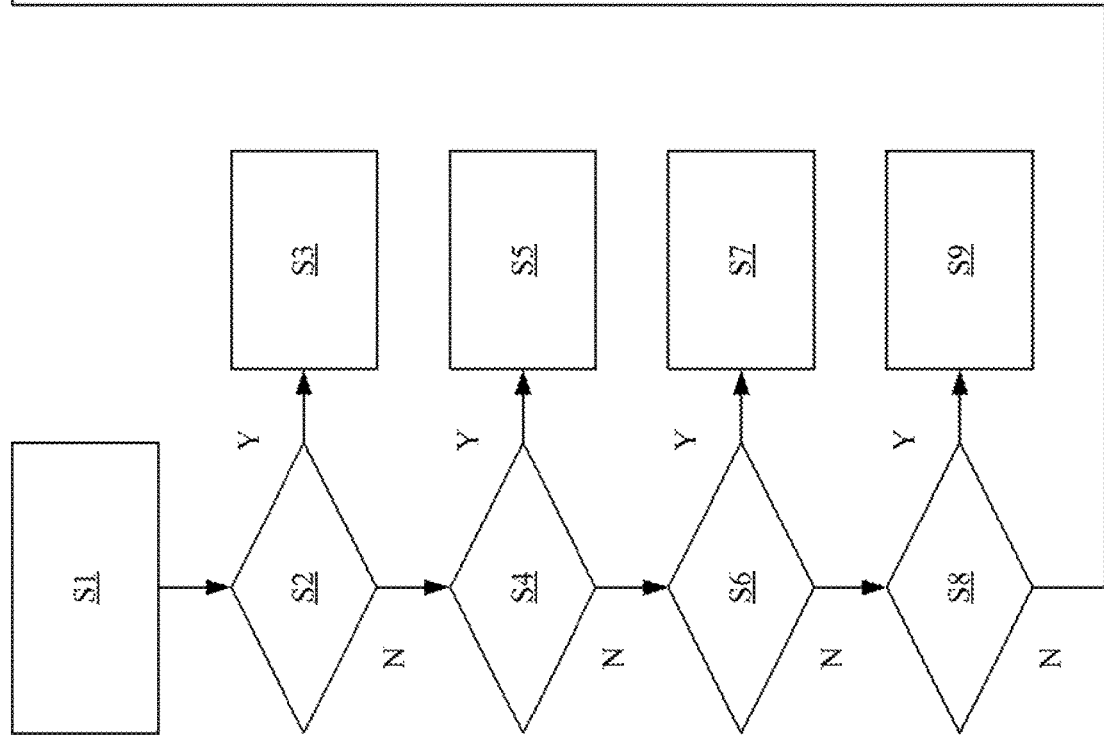

Reference is made to FIGS. 1 and 4. The operating method 400 includes the operations below.

In operation S1, the one or more processing components 110 control the communication component 130 to perform a scan procedure to receive a device name and an address of the external device 20.

In operation S2, the one or more processing components 110 determine whether the device name and/or the address name of the external device 20 match one or more of the policies stored in the memory 120. If so, operation S3 is performed. If not operation S4 is performed.

In operation S3, under a condition that the device name and/or the address name of the external device 20 match one or more of the policies stored in the memory 120, the one or more processing components 110 determine a connection interval corresponding to the external device 20 according to the matched one or more of the policies.

In operation S4, the one or more processing components 110 determine whether the external device 20 has a local power supply. If so, operation S5 is performed. If not, operation S6 is performed.

In operation S5, under a condition that the external device 20 has a local power supply, the one or more processing components 110 determine the connection interval corresponding to the external device 20 to be a shortest connection interval (e.g., 7.5 ms) available for the communication device 100.

In operation S6, the one or more processing components 110 determine whether a battery level of the external device 20 is greater than a predetermined threshold (e.g., 60%). If so, operation S7 is performed. If not, operation S8 is performed.

In operation S7, under a condition that the battery level of the external device 20 is greater than the predetermined threshold (e.g., 60%), the one or more processing components 110 determine the connection interval corresponding to the external device 20 according to the battery level of the external device 20.

In operation S8, the one or more processing components 110 determine whether data communicated between the communication device 100 and the external device 20 includes time-related data. If so, operation 89 is performed. If not, operation S10 is performed.

In operation S9, under a condition that the data communicated between the communication device 100 and the external device 20 includes time-related data, the one or more processing components 110 determine the connection interval corresponding to the external device 20 corresponding to the data communicated between the communication device 100 and the external device 20.

In operation S10, the one or more processing components 110 determine whether a loading of the external device 20 and/or a loading of the communication device 100 are lower than one or more predetermined thresholds (e.g., 60%). If so, operation S11 is performed. If not, operation S12 is performed.

In operation S11, under a condition that the loading of the external device 20 and/or the loading of the communication device 100 are lower than the one or more predetermined thresholds (e.g., 60%), the one or more processing components 110 determine the connection interval corresponding to the external device 20 according to the loading of the external device 20 and/or the loading of the communication device 100.

In operation S12, the one or more processing components 110 determine whether a degree of congestion between the communication device 100 and the external device 20 is light. If so, operation S13 is performed. If not, operation S14 is performed.

In operation S13, under a condition that the degree of congestion between the communication device 100 and the external device 20 is light, the one or more processing components 110 determine the connection interval corresponding to the external device 20 to be the shortest connection interval (e.g., 7.5 ms) available for the communication device 100.

In operation S14, the one or more processing components 110 determine whether the external device 20 is capable of the shortest connection interval (e.g., 7.5 ms) available for the communication device 100. If so, operation S15 is performed. If not, operation S16 is performed.

In operation S15, under a condition that the external device 20 is capable of the shortest connection interval (e.g., 7.5 ms) available for the communication device 100, the one or more processing components 110 determine the connection interval to be the shortest connection interval (e.g., 7.5 ms) available for the communication device 100.

In operation S16, the one or more processing components 110 determine whether an alarm occurs indicating that the connecting speed of the connection between the communication device 100 and the external device 20 should be fast. If so, operation S17 is performed. If not, operation S18 is performed.

In operation S17, under a condition that the alarm occurs, the one or more processing components 110 determine the connection interval corresponding to the external device 20 according to the alarm.

In operation S18, under a condition that the connection interval corresponding to the external device 20 is not determined in the previous operation, the one or more processing components 110 determine the connection interval corresponding to the external device 20 to be a default connection interval (e.g., 50 ms).

In operation S19, after the connection interval is determined, the one or more processing components 110 control the communication component 130 to build a connection with the external device 20 according to the determined connection interval and the address of the external device 20.

Through such operations, different connection intervals corresponding to different external devices can be determined individually.

It should be noted that, details of the operating method 400 can be ascertained with reference to the paragraphs above, and a description in this regard will not be repeated.

It should be noted that, in different embodiments, operations S2 and S3, operations S4 and S5, operations S6 and S7, operations S8 and S9, operations S10 and S11, operations S12 and S13, operations S14 and S15, and/or operations S16 and S17 can be omitted on a basis of actual requirements.

Figure 5:
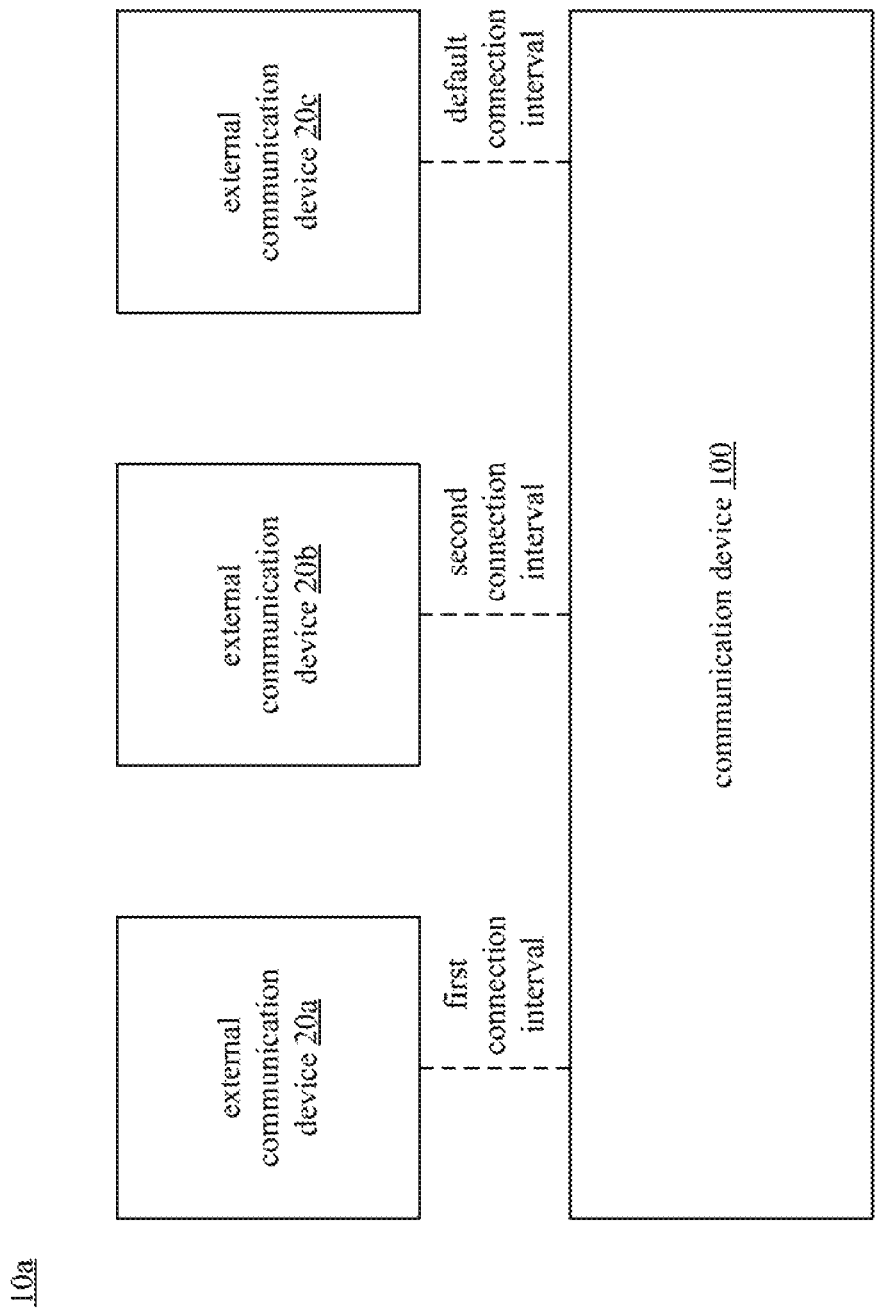
FIG. 5 illustrates an illustrative example of a communication system in accordance with one embodiment of the present disclosure.

To allow the disclosure to be more fully understood, illustrative examples are described in the paragraphs below with reference to FIG. 5, but the present disclosure is not limited to the examples below.

In this illustrative example, the communication system 10a includes the communication device 100 and the external devices 20a, 20b, 20c. The external devices 20a, 20b, 20c continuously broadcast their advertising data. For example, the external devices 20a, 20b, 20c may respectively broadcast their Bluetooth device names or their Bluetooth device addresses. As another example, the external devices 20a, 20b, 20c may respectively broadcast their BLE device names or their BLE device addresses.

The one or more processing components 110 perform a scanning procedure to receive device names and addresses of the external devices 20a, 20b, 20c. Subsequently, the one or more processing components 110 determine the connection intervals corresponding to the external devices 20a, 20b, 20c, and accordingly build the connections therebetween.

In this illustrative example, the connection interval of the connection between the one or more processing components 110 and the external device 20a is determined to be a first connection interval with a value 7.5 ms because that the device name of the external device 20a matches one of the policies in memory 120. The connection interval of the connection between the one or more processing components 110 and the external device 20b is determined to be a second connection interval with a value 30 ms because that the battery level of the external device 20b is between 60%-80%. The connection interval of the connection between the one or more processing components 110 and the external device 20c is determined to be the default connection interval with a value 50 ms because that the external device 20c does not fit any condition described in operations S2, S4, S6, S8, S10, S12, S14, S16.

Through the operations described above, different connection intervals corresponding to external devices 20a, 20b, 20c can be determined individually.

It should be noted that, in some embodiments, the operating methods 200, 300, 400 described above may be implemented as a computer program. When the computer program is executed by a computer, an electronic device, or the one or more processor one or more processing components 110 in FIG. 1, this executing device performs the operating method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the operating methods described above, no particular sequence is required unless otherwise specified. Moreover, the operations of the operating methods described above also may be performed simultaneously or the execution times thereof may at least partially overlap.

Furthermore, the operations of the operating method described above may be added to, replaced, and/or eliminated as appropriate, in accordance with various embodiments of the present disclosure.

Although the present invention has been described in considerable detail with reference to certain embodiments thereof, other embodiments are possible. Therefore, the scope of the appended claims should not be limited to the description of the embodiments contained herein.

What is claimed is:

1. A method of a communication device comprising:
performing a scan procedure to receive a device name and an address of an external device;
determining a connection interval corresponding to the external device according to one or more policies stored in the communication device under a condition that the device name or the address match the one or more policies, and determining the connection interval according to at least one of the following criteria: a loading of the external device or a loading of the communication device, a degree of congestion between the communication device and the external device, and the capacity of the connection interval of the external device; and
building a connection with the external device according to the connection interval and the address of the external device, so that the communication device and the external device communicate corresponding to the connection interval.

2. The method as claimed in claim 1 further comprising:
determining the connection interval according to whether the external device has a local power supply.

3. The method as claimed in claim 1 further comprising:
determining the connection interval according to a battery level of the external device.

4. The method as claimed in claim 1 further comprising:
determining the connection interval according to whether data communicated between the communication device and the external device includes time-related data.

5. A communication device comprising:
a communication component;
one or more processing components electrically connected to the communication component;
a memory electrically connected to the one or more processing components; and
one or more programs, wherein the one or more programs are stored in the memory and configured to be executed by the one or more processing components, the one or more programs comprising instructions for:
controlling the communication component for performing a scan procedure to receive a device name and an address of an external device;
determining a connection interval corresponding to the external device according to one or more policies stored in the communication device under a condition that the device name or the address match the one or more policies, and determining the connection interval according to at least one of the following criteria: a loading of the external device or a loading of the communication device, a degree of congestion between the communication device and the external device, and the capacity of the connection interval of the external device; and
controlling the communication component for building a connection with the external device according to the connection interval and the address of the external device, so that the communication device and the external device communicate corresponding to the connection interval.

6. The communication device as claimed in claim 5, wherein the one or more programs comprises instructions for:
determining the connection interval according to whether the external device has a local power supply.

7. The communication device as claimed in claim 5, wherein the one or more programs comprises instructions for:
determining the connection interval according to a battery level of the external device.

8. The communication device as claimed in claim 5, wherein the one or more programs comprises instructions for:
determining the connection interval according to whether data communicated between the communication device and the external device includes time-related data.

9. A non-transitory computer readable storage medium storing one or more programs comprising instructions, which when executed, causes one or more processing components to perform operations comprising:
performing a scan procedure to receive a device name and an address of an external device;
determining a connection interval corresponding to the external device according to one or more policies stored in the communication device under a condition that the device name or the address match the one or more policies, and determining the connection interval according to at least one of the following criteria: a loading of the external device or a loading of the communication device, a degree of congestion between the communication device and the external device, and the capacity of the connection interval of the external device; and
building a connection with the external device according to the connection interval and the address of the external device, so that the communication device and the external device communicate corresponding to the connection interval.

10. The non-transitory computer readable storage medium as claimed in claim 9 comprising instructions, which when executed, causes the one or more processing components to further perform operations comprising:
determining the connection interval according to whether the external device has a local power supply.

11. The non-transitory computer readable storage medium as claimed in claim 9 comprising instructions, which when executed, causes the one or more processing components to further perform operations comprising:
determining the connection interval according to a battery level of the external device.

12. The non-transitory computer readable storage medium as claimed in claim 9 comprising instructions, which when executed, causes the one or more processing components to further perform operations comprising:
determining the connection interval according to whether data communicated between the communication device and the external device includes time-related data.

13. The non-transitory computer readable storage medium as claimed in claim 9 comprising instructions, which when executed, causes the one or more processing components to further perform operations comprising:
determining the connection interval according to the capacity of the connection interval of the external device.

* * * * *